March 13, 1928. 1,662,804
C. DRESSLER
METHOD OF AND APPARATUS FOR VULCANIZING
Filed Nov. 24, 1919 6 Sheets-Sheet 1
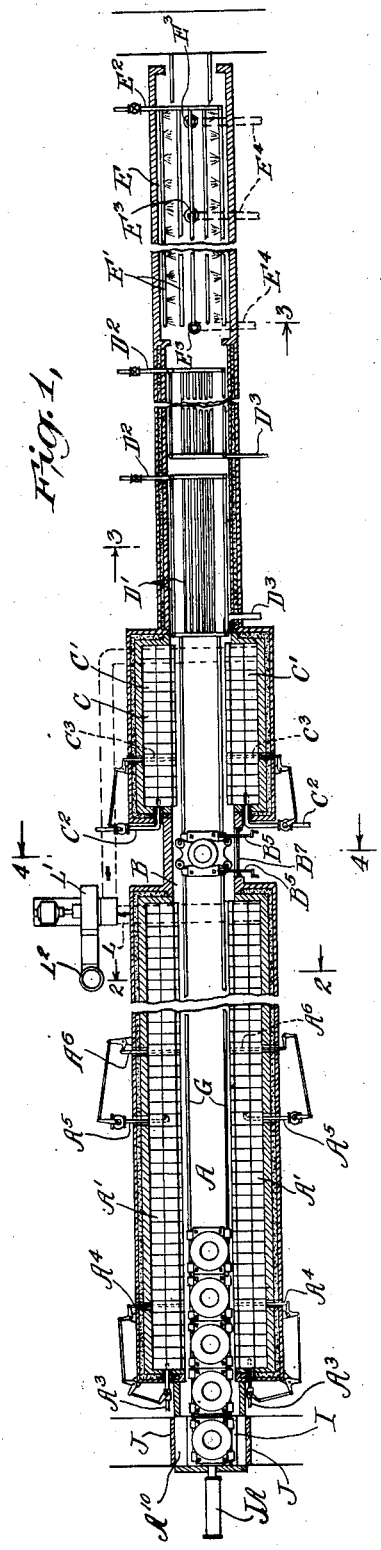
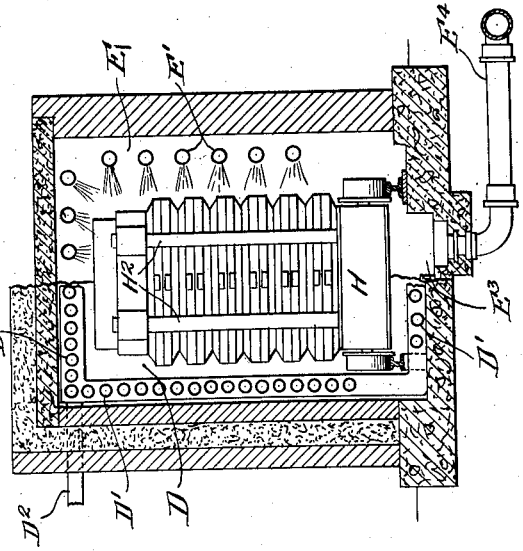
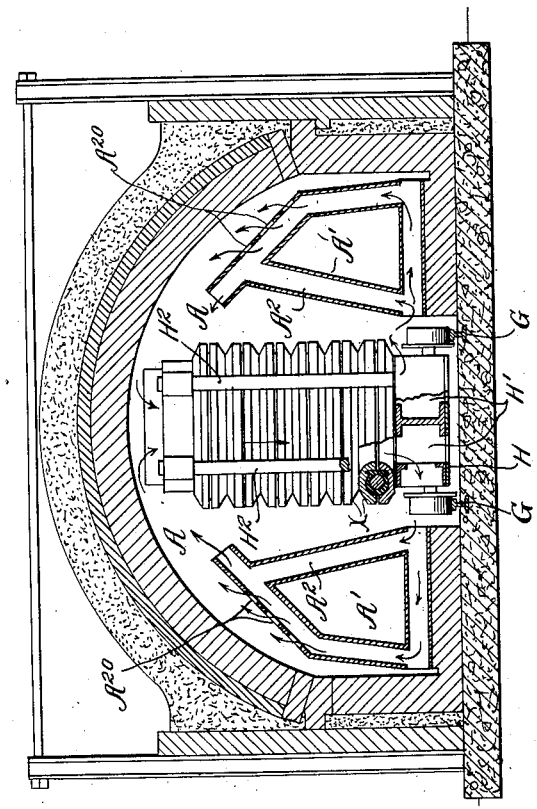
Inventor
Conrad Dressler
By his Attorney
John E. Hubbell.

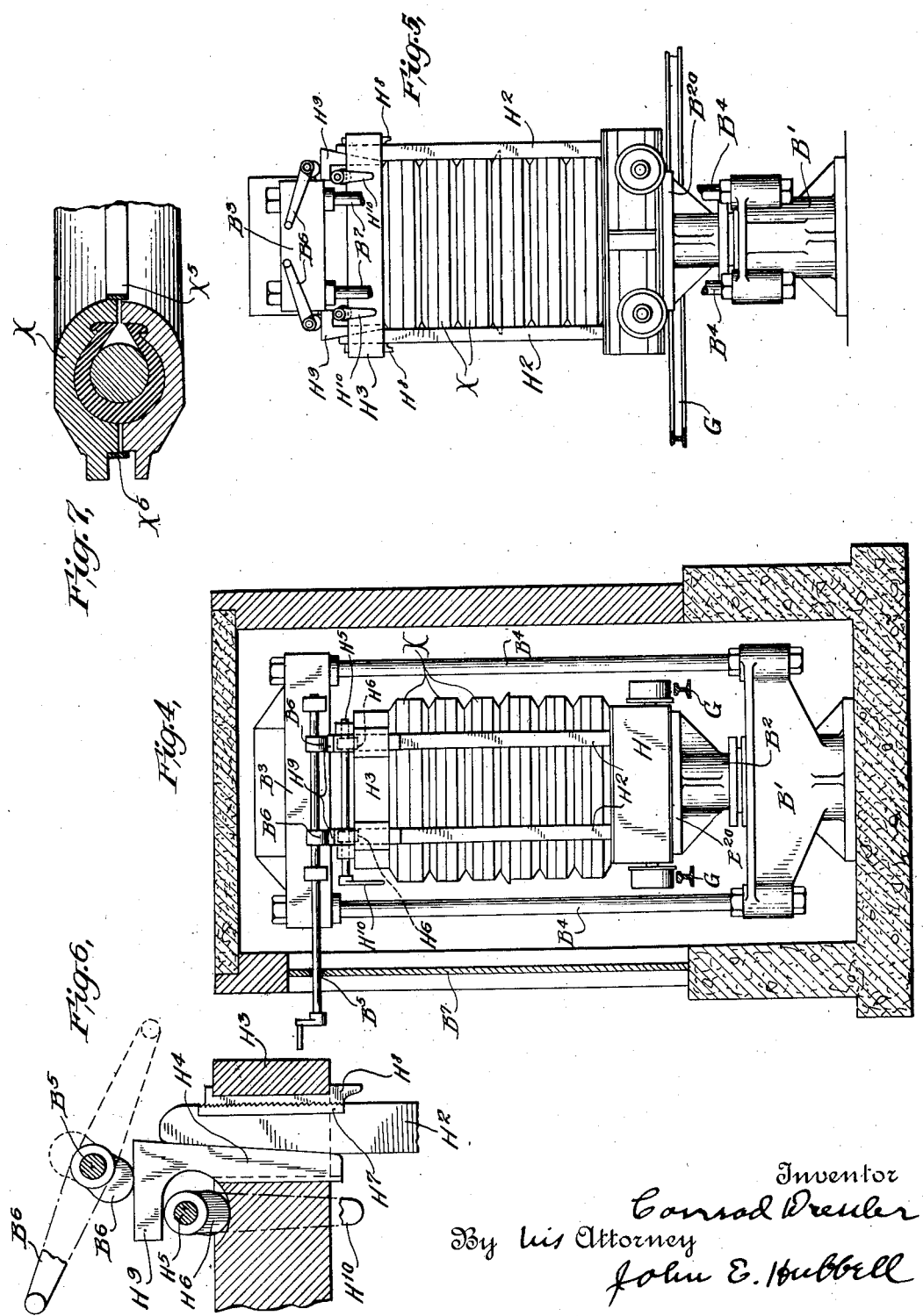

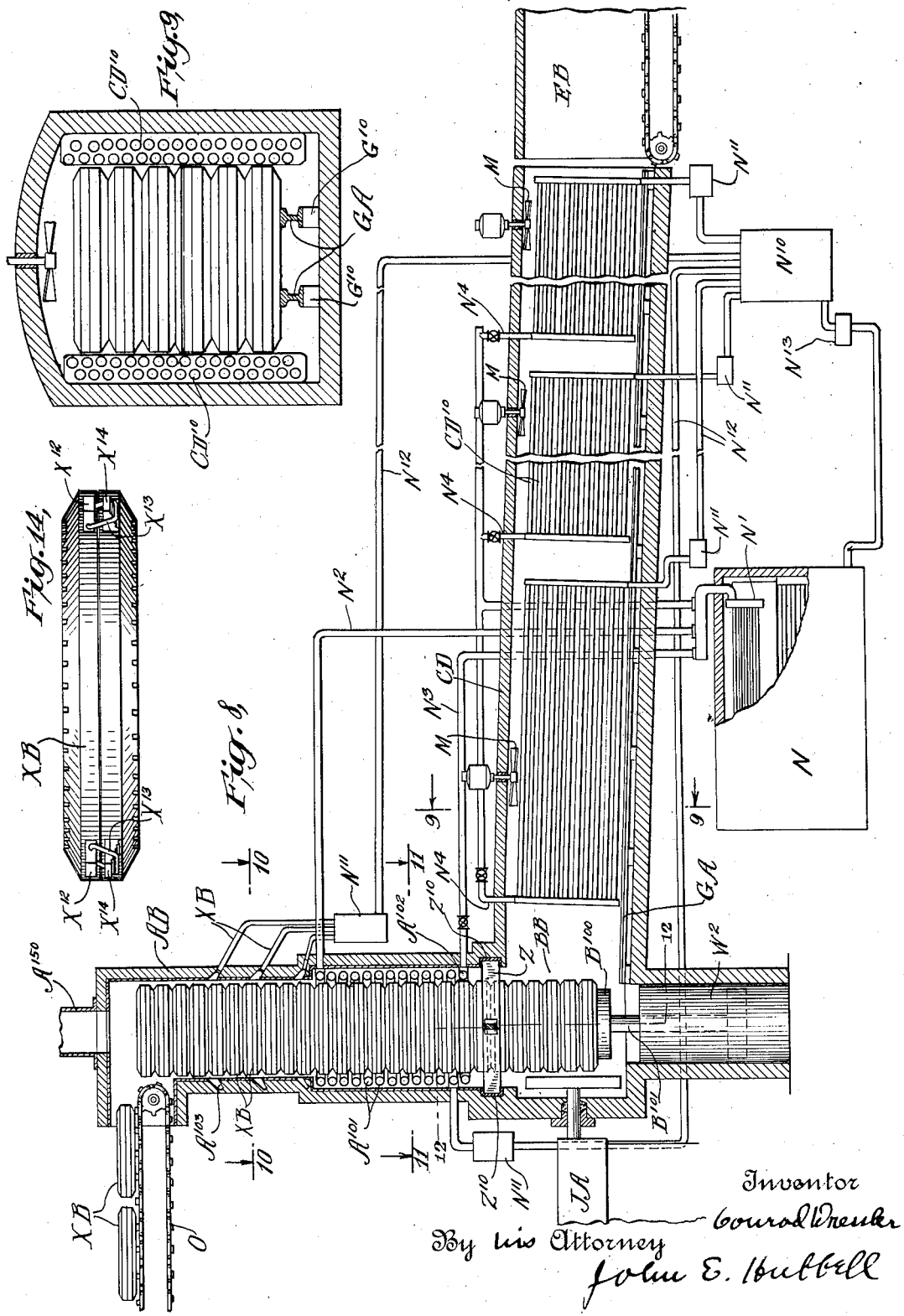

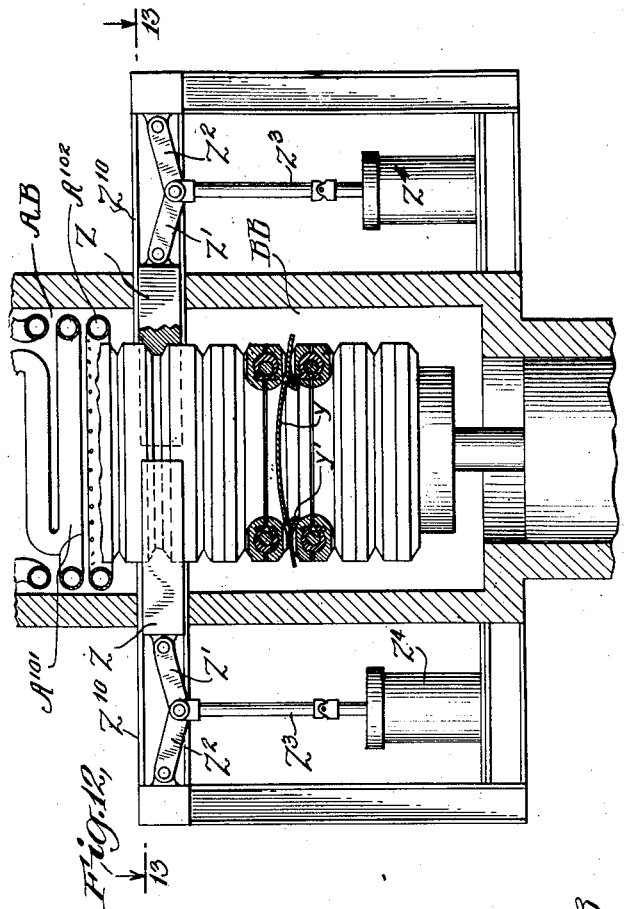
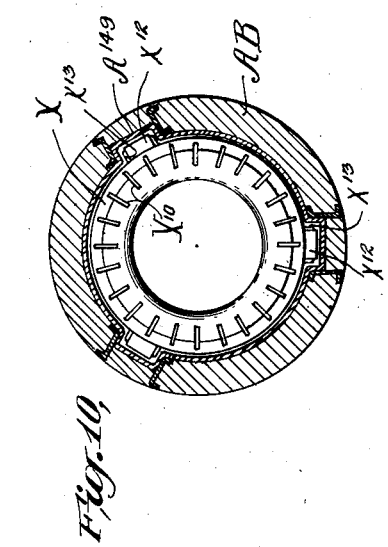
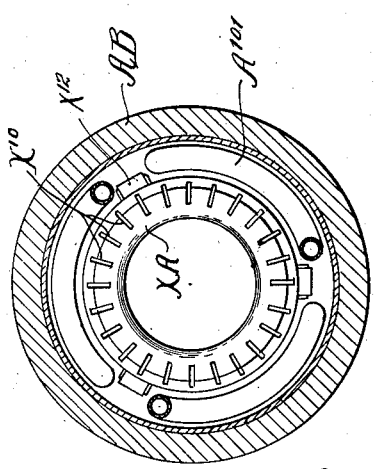

March 13, 1928.  
C. DRESSLER  
1,662,804  
METHOD OF AND APPARATUS FOR VULCANIZING  
Filed Nov. 24, 1919  
6 Sheets-Sheet 5
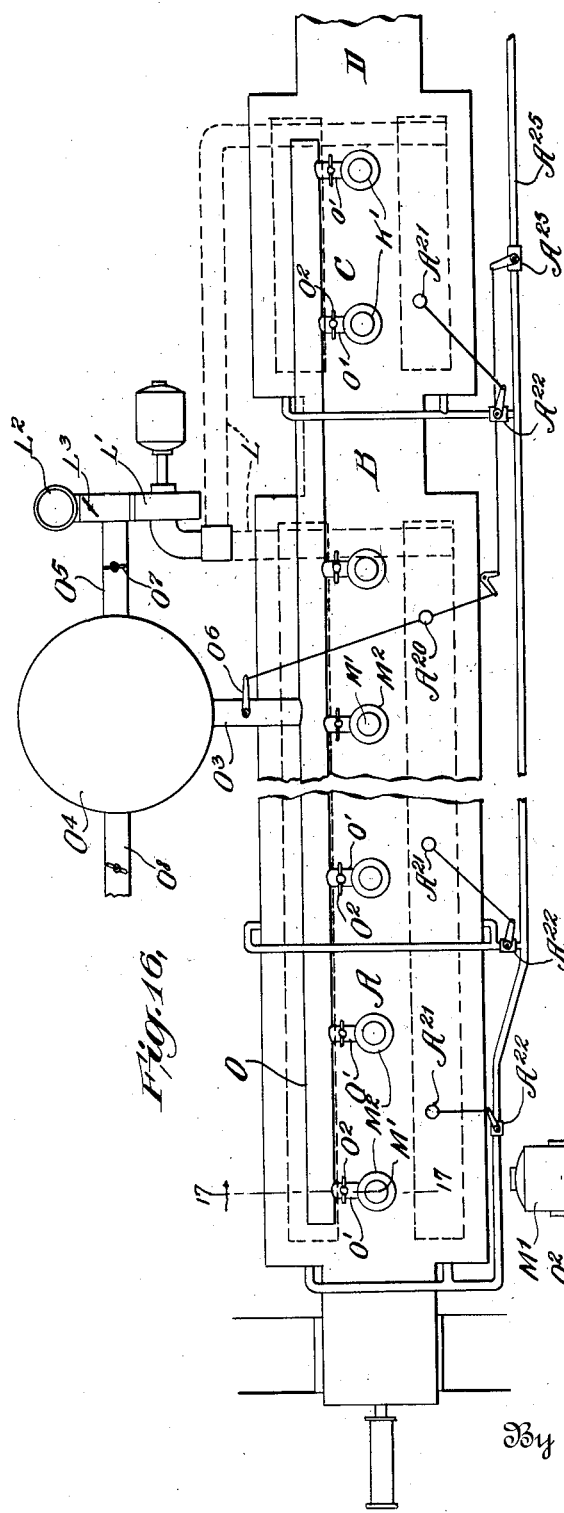
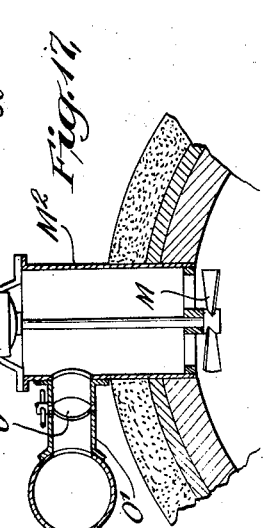
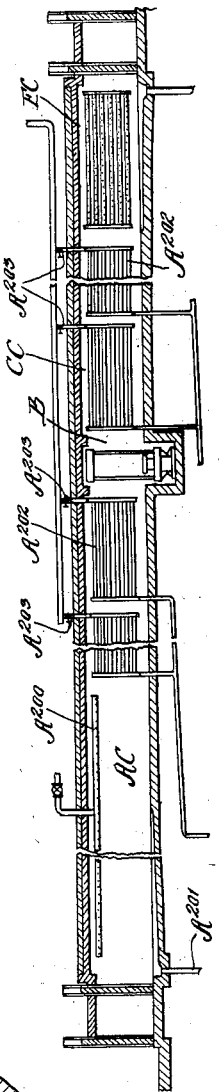
Inventor  
Conrad Dressler  
By his Attorney  
John E. Hubbell March 13, 1928. 1,662,804
C. DRESSLER
METHOD OF AND APPARATUS FOR VULCANIZING
Filed Nov. 24, 1919 6 Sheets-Sheet 6
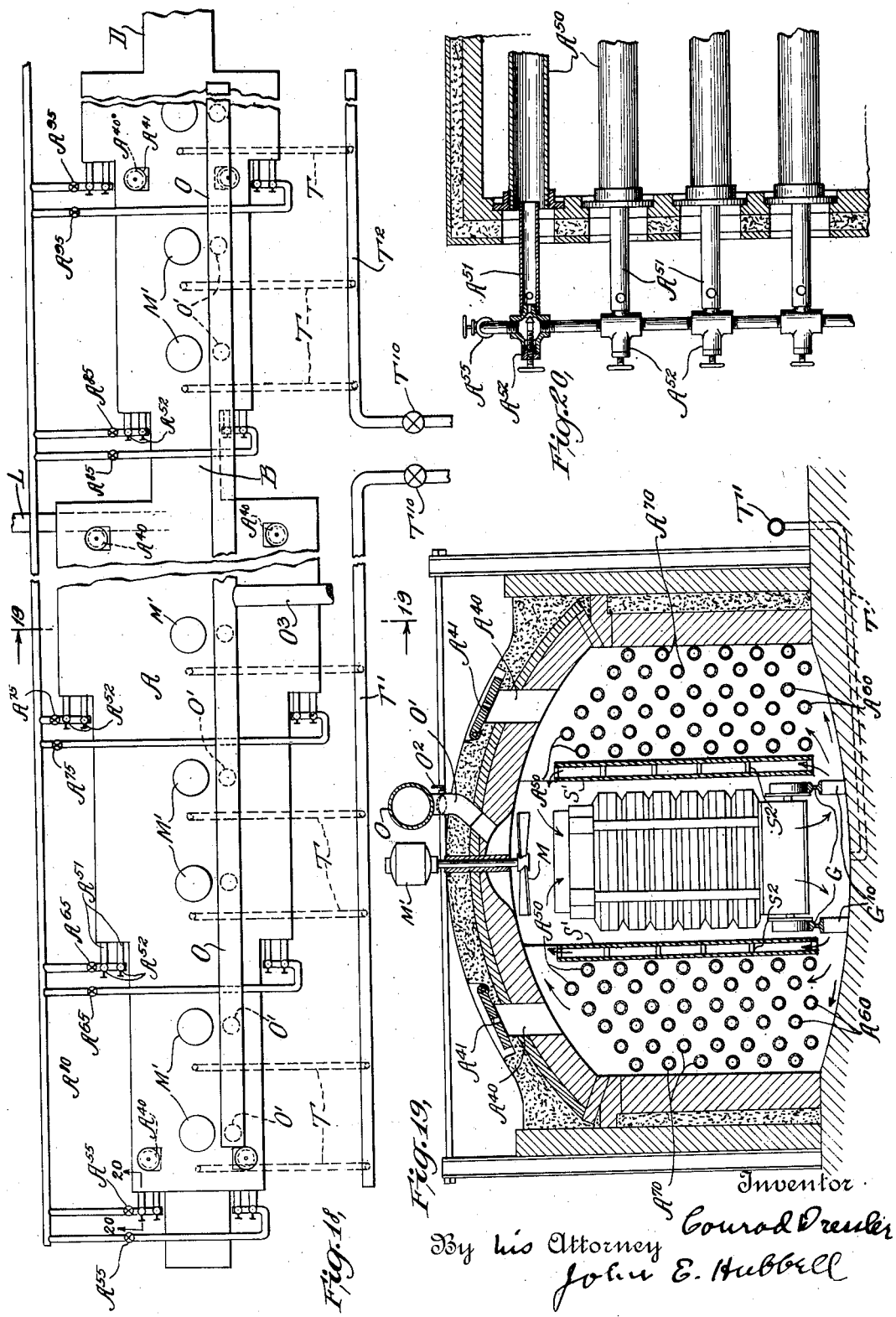

Patented Mar. 13, 1928.

1,662,804

UNITED STATES PATENT OFFICE.

CONRAD DRESSLER, OF NEW YORK, N. Y., ASSIGNOR TO AMERICAN DRESSLER TUNNEL KILNS, INC., OF NEW YORK, N. Y., A CORPORATION OF NEW YORK.

METHOD OF AND APPARATUS FOR VULCANIZING.

Application filed November 24, 1919. Serial No. 340,308.

My present invention comprises an improved method of vulcanizing rubber and particularly such rubber articles as automobile tires, boots, shoes, rubber cloth and the like, and apparatus especially devised for carrying out my improved method of vulcanizing, though useful for other purposes. The primary object of my invention is to provide a simple and effective method of an apparatus for the purpose specified, which shall be continuous in operation, thus broadly differentiating it from the intermittent methods of and apparatus for vulcanization now in general use.

The operation of vulcanizing rubber articles involves a heat treatment for the requisite curing period. The temperatures best adapted for vulcanization and the periods during which rubber articles should be subjected to the vulcanization temperatures depend upon the character of the article and upon the composition and kind of rubber out of which the article is made. In general, however, the temperatures of vulcanization are in the neighborhood of 300° F and the vulcanizing or curing period during which the rubber must be subjected to these temperatures varies usually from an hour or so up to several hours.

In some cases the rubber articles are freely exposed to the atmosphere of the vulcanization chamber which may be steam or air and in some cases the articles are wholly or largely enclosed in moulds. Rubber boots and shoes, for example, are ordinarily made by pasting unvulcanized rubber and fabric together over a last-like form and then passing the forms with the rubber and fabric on them into a vulcanizing chamber, the rubber outer surfaces of the boots and shoes being entirely exposed to the atmosphere of the vulcanizing chamber. In forming automobile tires on the other hand, the most usual practice involves the building up of the tire about a ring shaped core and the placing of this core with the tire forming material assembled on it in a two part metallic mould, the two parts of which are initially held apart by the tire and core, but are subsequently forced together to compact the tire forming material and to cause the rubber of the tire to fill out the cavities and particularly the tread forming cavities of the mould. It is common practice to press the two parts of the mould together after the tire has been heated up in the course of the vulcanization process to a temperature at which the rubber of the tread softens.

In proceeding in accordance with the present invention I pass the rubber articles to be vulcanized, whether enclosed in moulds or not, slowly and continuously through an elongated heating and vulcanizing chamber in such a manner that each rubber article is more or less gradually heated up and is subjected to the vulcanizing heat for the necessary period of vulcanization. In vulcanizing tires or the like in moulds, I preferably press the moulds together without withdrawing them from the vulcanization chamber by means of mould compressing apparatus located at a point in the chamber at which the tires are heated up to the temperature at which it is desirable to close the moulds. Advantageously, also I utilize a final portion of the heating and vulcanizing chamber as a cooling chamber in which the articles treated, the moulds if moulds are used, and the carrying mechanism are cooled down to a temperature at which they can be handled, preferably in such a manner as to recover heat from them in a form in which it can be economically utilized.

My continuous vulcanizing chamber may obviously be heated in various ways. For example, it may be constructed like a continuous muffle kiln and be heated entirely by combustion in, and the flow of products through the muffle passages or combustion chambers of the kiln, or in place of such combustion chambers other hot bodies as steam pipes or electrical heaters may be employed. In some cases one section of the kiln may be heated in one way and another section heated in a different way. Thus, one section may be heated by the use of hot bodies and another by the direct introduction into it of steam. Where the heating chamber is not heated by the introduction of steam, the kiln atmosphere may be formed of atmospheric air or any other suitable gaseous medium such as carbon dioxide, or steam or various mixtures of gases and vapors.

The continuous vulcanization of tires, boots, shoes and other articles in accordance with the present invention possesses important practical advantages over the intermittent processes now in common use in that in general it results in substantial reductions in the cost of the necessary fuel and labor and also in the cost of construction and maintenance of the apparatus required for handling a given output. While with the continuous process of vulcanization it is necessary in general to subject the articles to be vulcanized to heat radiation from sources, or to the action of currents of the vulcanizing chamber atmosphere heated by sources, at temperatures appreciably above that to which rubber can be subjected without injury, all danger of overheating the rubber may be substantially eliminated by the use of suitable provisions. Advantageously, I employ thermostatic control mechanism for stopping the generation of heat in the vulcanization apparatus when the temperature in the latter rises above a desirable maximum. Where, as may frequently be the case, my continuous vulcanizing apparatus includes metal or firebrick portions of considerable heat storage capacity, normally at a temperature above the maximum temperature to which rubber can safely be subjected, I preferably provide means for cooling the vulcanizing chamber when necessary as by injecting into it cool air, carbon dioxide or water which is vaporized by the heat prevailing in the chamber. Where, as in forms of apparatus which I consider preferable in many cases, the rubber articles are heated wholly or largely by a gaseous medium which is itself heated by contact with fire heated conduit or muffle walls or other hot bodies, the necessary circulation may be wholly due to convection currents, but I prefer in many cases to supplement the natural convection current circulation by the action of fans. The vigorous circulation in the vulcanization chamber thus obtained not only tends to equalize the temperature at different levels, but also increases the effective capacity of the apparatus.

The various features of novelty which characterize my invention are pointed out with particularity in the claims annexed to and forming a part of this specification. For a better understanding of the nature of the invention and the specific objects attained with it reference should be had, however, to the accompanying drawings and descriptive matter in which I have illustrated and described in detail various embodiments of my invention.

Of the drawings:

Fig. 1 is a somewhat sectional plan of one form of vulcanizing apparatus;

Fig. 2 is a section on the line 2—2 of Fig. 1;

Fig. 3 is a section on the broken line 3—3 of Fig. 1;

Fig. 4 is a section on the line 4—4 of Fig. 1;

Fig. 5 is an elevation of a portion of the apparatus shown in Fig. 1 taken at right angles to the latter;

Fig. 6 is an enlarged section of the apparatus shown in Fig. 5;

Fig. 7 is a partial section of a modified form of tire mould;

Fig. 8 is a diagrammatic elevation partly in section of another type of tire vulcanizing apparatus;

Fig. 9 is a section on the line 9—9 of Fig. 8;

Fig. 10 is a section on the line 10—10 of Fig. 8;

Fig. 11 is a section on the line 11—11 of Fig. 8;

Fig. 12 is a partial section on the line 12—12 of Fig. 8;

Fig. 13 is a plan view of the detail of the mechanism shown in Figs. 8 and 12;

Fig. 14 is an elevation of a tire mould employed with the apparatus shown in Fig. 8;

Fig. 15 is a diagrammatic elevation in section illustrating a modification;

Fig. 16 is a diagrammatic plan of the apparatus shown in Fig. 1 with certain additional features;

Fig. 17 is a partial section on the line 17—17 of Fig. 16;

Fig. 18 is a diagrammatic plan illustrating another modification;

Fig. 19 is a section on the line 19—19 of Fig. 18; and

Fig. 20 is a partial section on the line 20—20 of Fig. 18.

The apparatus shown in Figs. 1-6 was particularly designed for use in vulcanizing rubber tires in metallic moulds. As shown, it comprises a tunnel kiln composed of the following successive sections or zones, namely: a preliminary heating zone A; a mould compressing zone B; a secondary heating zone C; a curing or soaking zone D; and a cooling zone E. The tires with their moulds X are moved through the kiln by means of cars H running on the track rails G. As shown, each car is adapted to hold six tires with their moulds X which are stacked up one on top of another. The tire carrying cars are inserted into an antechamber $A^{10}$ at the entrance end of the kiln past one or the other of the two doors J by means of a transfer car I such as is commonly employed in inserting goods carrying cars into tunnel kilns. Each car brought into the antechamber $A^{10}$ by the transfer car, is moved through the latter into the preliminary heating zone of the kiln as by means of a suitable device JA, such as a hydraulic pusher. The pusher JA in moving a car H off of the transfer car I and into the kiln proper, serves also to advance the train of cars H filling the kiln a car length; a car H with its tires vulcanized thereby being ejected from the outlet end of the cooling zone of the kiln each time a car H loaded with unvulcanized tires is inserted at the entrance end of the kiln. While the movement of the cars is thus intermittent, the operation of the kiln as a whole is continuous since each car is progressively advanced through the various sections of the kiln and at any one instant in normal operation, tires mounted on the different cars H distributed throughout the length of the kiln are undergoing all the stages of the vulcanizing operation.

The preliminary heating zone of the kiln in the construction shown in Figs. 1–6 is constructed like the heating zone of the well-known Dressler tunnel kiln, shown for example, in my prior Patents 1,023,628 and 1,170,428. As shown, a combustion chamber $A'$ is provided at each side of the pathway for the cars H through the kiln section A, running the full length of this section of the kiln. Each combustion chamber $A'$ is shown as having its walls formed of hollow tile sections having open ended ventilating channels $A^2$ with windows $A^{20}$ opening through the upper sides of the walls of the channels $A^2$ in the top wall of the combustion chamber so that the heat generated in the combustion chamber causes the gravity circulation of the kiln atmosphere upward past the combustion chambers $A'$ and downward through the pathway for the goods, as indicated by the arrows in Fig. 2, which is typical of the Dressler kiln. The goods carrying cars H, which with the relatively low temperatures employed may be made wholly of metal are formed with passages $H'$ for the air flowing downward through the tire moulds piled on them. The combustion chambers $A'$ are internally heated by the combustion of fuel which with the air supporting combustion are introduced into each combustion chamber at an appropriate point or points. In the apparatus shown, for reasons hereinafter explained, I prefer to initiate combustion in the end of each combustion chamber adjacent the entrance end rather than, in accordance with the more usual custom, at the opposite end of the combustion chamber. As shown, $A^3$ represents a gas burner supply pipe entering each combustion chamber through an aperture formed in the end wall of the latter, this aperture being large enough to permit the entrance of atmospheric air to burn the gas.

Advantageously, the supply of fuel is automatically regulated in response to temperature conditions within the kiln. As shown, the flow of gas through the pipes $A^3$ is controlled by a corresponding thermostat $A^4$ inserted into the kiln section A at some distance in advance of the entrance end of the kiln. Advantageously, also, provisions may be made for admitting fuel to each combustion chamber at a point or points in advance of the burners $A^3$. As shown, each combustion chamber is provided for this purpose with a second gas supply burner nozzle $A^5$ controlled by a thermostat $A^6$ which may well be located some distance ahead of the nozzle $A^5$. The external wall of the kiln section A may be constructed as indicated in Fig. 2 in accordance with the ordinary practice of constructing Dressler kilns except that the relatively low temperatures required in the present apparatus make the provisions for insulating against heat radiation losses and for taking care of the thermal expansion and contraction somewhat less important than is ordinarily the case in a Dressler kiln.

The products of combustion are sucked out of the combustion chambers $A'$ at their ends adjacent the section B by means of a blower $L'$ and a duct L connecting the latter to the combustion chambers. As shown, the blower $L'$ delivers the products of combustion to a stack $L^2$.

To prevent the direct contact between any portion of the rubber of the tires and the heated kiln atmosphere when the moulds are in their open condition as they are going thru the preliminary heating zone A, I may provide the tire moulds X with flanges overlapping the joints between the two parts of each mould at their inner and outer edges. When moulds not initially formed with these flanges are employed, they may be provided with such flanges by securing curved bands $X^5$ and $X^6$ to the inner and outer sides of one section of the mould as shown in Fig. 7.

The mould pressing zone B is shown as of sufficient length to permit of the incorporation of the mould press. The latter, as shown, comprises a base $B'$ provided with a cylinder receiving the piston $B^2$ carrying the movable press head $B^{20}$. The base $B'$ is connected to the upper stationary cross head $B^3$ of the press by the posts or strain rods $B^4$. In the operation of this portion of the apparatus, when a car H is moved into position above the press head $B^{20}$, pressure is admitted to the cylinder in the base $B'$ to raise the head $B^{20}$, the latter engages the underside of the body of the car H and lifts the latter off the track rails G, as shown in Figs. 4 and 5. The raising of the car body brings the follower or compressor head $H^3$ which rests on the stack of tire moulds on the car up against the ram head or abutment $B^3$. The follower $H^3$ is guided on four posts $H^2$ secured to the car body. These posts are moved upward through the cross head $H^3$ by the upward movement of the presshead $B^{20}$ until the sectional moulds X are closed. The crosshead $H^3$ is then locked to the posts $H^2$ to hold the moulds closed during the subsequent stages of operation.

To lock the crosshead $H^3$ to the posts $H^2$,

I provide a locking wedge H⁴ for each post H² which enters the upper side of the aperture in the cross head H³ through which the corresponding post H² projects. I provide in conjunction with the wedges H⁴ means for forcing the wedges H⁴ home and thereby locking the crosshead to the posts at the end of the mould closing operation. These means comprise a pair of horizontal shafts B⁵ journaled on the stationary ram head or abutment B³ and having portions projecting through the wall of the kiln and provided externally of the kiln with handles by means of which the shafts may be rotated. Each shaft B⁵ carries two cams B⁶ which when the shaft is rotated engage a corresponding pair of wedges H⁴ and force the latter home. Advantageously as shown one of the side walls of the kiln zone B is formed with a window B⁷ through which the operations carried on in the zone B may be observed by the workman responsible for these operations.

As a convenient means for releasing the wedges H⁴ to permit of the removal of the cross head H³ so that the vulcanized tires with their moulds may be removed and moulds containing unvulcanized tires may be put in place on the cars H, I conveniently journal on the upper side of each cross head H³ a pair of shafts H⁵ each carrying a pair of cams H⁶ adapted to engage the undersides of projections H⁹ of the wedges H⁴ when the shafts H⁵ are rotated and thus lift the wedges. When the mould carrying cars H are initially inserted in the kiln, the operating handles H¹⁰ for the shafts H⁵ hang downward as do the cams H⁶ so that the cams do not then interfere with the subsequent necessary movement of the wedges to lock the crosshead to the posts H² when the car is in the kiln zone B.

The secondary heating zone C of the kiln is substantially identical in construction with the section A except that it will ordinarily be shorter. The two combustion chambers C' one at each side of the pathway for the goods may each be identical in construction with the combustion chambers A' first described. As shown, each combustion chamber C' is provided with an inlet for atmospheric air and a gas burner nozzle C² in the end of the combustion chamber adjacent the zone B, the supply of fuel to the gas nozzle C² being automatically controlled by thermostats C³ located in the interior of the zone C.

The curing or soaking zone portion D of the kiln is shown as provided with steam pipes D' at the sides, top and bottom. These pipes run lengthwise of the kiln. As shown, the pipes D' are arranged in sections with headers at their ends, each section having one or more supply pipes D² each with its separate controlling valve and having an outlet or outlets D³ for water of condensation.

At the sides and top of the cooling zone E are provided water spray pipes E' which run lengthwise of the kiln and have apertures through which water supplied by the pipe E² is sprayed on the tire moulds on the cars H occupying this zone of the kiln. The water sprayed on the moulds and cars collects in a channel E³ at the bottom of the kiln and is withdrawn through an outlet E⁴.

In the operation of the apparatus shown in Figs. 1–6 cars H are inserted in the antechamber A¹⁰ one at a time. Each car, thus moved into the antechamber A¹⁰ is pushed from the latter into the preliminary heating zone A by the pusher JA. This action advances the train of cars H normally filling the apparatus a car length each time a car is inserted, and a car is therefore ejected from the exit end of the cooling zone E each time a car is moved into the preliminary heating zone A. The combustion of the gaseous fuel supplied to the combustion chambers A' by the pipes A³ and A⁵ heats up the combustion chambers and the heat thereby given to the walls of the combustion chambers is largely transferred to the tires, the cores upon which they are mounted, moulds X in which they are held, and the cars H upon which they are transported by means of convection currents of the kiln atmosphere which flow along the lines indicated by the arrows in Fig. 2. These currents are induced by the decrease in density of the air as it passes upward along the combustion chamber and is thereby heated and the increase in the density of the air as it cools in passing downward along the outer and inner surfaces of the stacks of moulds on the cars and through the channels H' in the bottoms of the latter. By suitably proportioning the apparatus and a suitable regulation of the supply of gaseous fuel, the tires may be heated more or less gradually up to the desired temperature in the passage of the tires through the preliminary heating zone A.

While in general, I prefer that the tires themselves should heat up gradually, I consider it practically desirable to supply heat to the zone A more rapidly at its entrance end than at its exit end, and for this purpose the temperature of the combustion chambers and of the kiln atmosphere may be substantially higher adjacent the entrance end than adjacent the exit end of the zone. With the tires and moulds of the general character illustrated in Figs. 1 to 6, a great deal more heat must be put into a mould and core than is put into the rubber tire itself. With a tire weighing 80 or 90 pounds, the mould in which it is vulcanized oridinarily weighs a thousand pounds or so. On account of the thickness of the mould, the mould itself may be subjected initially to a temperature much above that to which its rubber content could be subjected without injury, since a considerable period of time is required for the absorption of heat by the mould and its transfer through the mould to appreciably raise the temperature of the inner surface of the mould and thereby of the tire. While with the form of mould shown in Figs. 1 to 6 there is an open joint in the mould, those skilled in the art will readily understand that the portion of the tire exposed at the mould joint will not be subjected to the temperature of the kiln atmosphere as long as the mould remains substantially cooler than the kiln atmosphere. This joint will be filled with a comparatively stagnant body of air but little warmer than the mould surface with which it is in contact. All possibility of local overheating of the tire at the mould joint may obviously be avoided with the special mould illustrated in Fig. 7.

The utilization of temperatures at the inlet end of the zone A higher than can be safely used at the exit end of the zone possesses the important advantage that the large temperature differential between the moulds and the kiln atmosphere thus obtained at the entrance end of the kiln enables me to put heat into the moulds more rapidly than would be otherwise possible, and thus enables me to reduce the length of the zone A for a given vulcanizing capacity.

The operation of the mould closing apparatus in the zone B of the kiln has already been described. It will be understood that in normal operation, the mould press in the zone B is operated during each interval in which the car pusher JA is being retracted and a cool car with its moulds and unvulcanized tires is being moved into the antechamber $A^{10}$ and that during the operation of the mould compressing apparatus, travel of the train of cars in the kiln is interrupted.

The operation in the secondary heating zone C is substantially the same as that in zone A. In the preferred contemplated mode of using the apparatus shown each tire is raised in temperature in its passage thru the zone from the temperature at which the tires leave the zone A to the maximum vulcanization temperature desired and in the vulcanizing or curing zone the tires are maintained at a constant temperature. To maintain the tires at a constant temperature in the zone it is only necessary to supply heat in this zone as required to make up for radiation and other losses of heat. As these losses are comparatively small, a simple steam heating system such as that shown and described above, forms an ideal means for heating the zone D, because of the ease with which the temperature of the zone may be controlled. For this purpose, all that is necessary is to supply steam to the radiating pipes D' at a pressure corresponding to the desired temperature; the steam thus supplied will be condensed in the pipes and thereby give up its latent heat as required to make up for the radiation and other losses.

As the cars pass through the cooling zone E, the cars, moulds and contents of the latter, are rapidly cooled by water sprayed against them from the pipes E'. This water may be withdrawn through the outlets $E^4$ nearly at the boiling temperature, and is available for any use to which clean hot water may be put. For instance, it may be used as boiler feed water.

Apparatus of the type illustrated in Figs. 1 to 6 may readily have added to it provisions for augmenting the natural convection current circulation of the kiln atmosphere, or for maintaining a special kind of atmosphere in the vulcanization chamber, or for injecting a cooling medium into the vulcanization chamber when this becomes necessary or desirable, and in Figs. 16 and 17 I have illustrated one form of provisions for accomplishing all of these purposes.

The apparatus shown in Figs. 16 and 17 is provided with a plurality of fans M located at intervals along the top of the preliminary heating zone A and the secondary heating zone C. As shown, each fan is carried at the lower end of the vertical shaft of a corresponding motor M' mounted at the upper end of a tubular casing $M^2$ which passes through the top wall of the kiln. Each fan is so operated as to direct a blast downward through the space traversed by the cars H and the moulds carried by the latter. As shown, each casing $M^2$ is connected by a lateral branch O' to a conduit O running lengthwise of the kiln above the latter. The conduit O is connected by a conduit $O^3$ to a gas holder $O^4$. The latter is connected by a conduit $O^5$ to the outlet from the exhaust fan L'. The valve $O^7$ in the conduit $O^5$ and a valve $L^3$ at the inlet to the stack $L^2$ form a means by which the gas holder $O^4$ may be normally kept full of products of combustion. The discharge of the products of combustion from the gas holder to the conduit O is regulated by a valve $O^6$ which is normally closed either wholly or substantially so. By permitting a leakage or restricted flow past the valve $O^6$ carbon dioxide may be supplied to the conduit O and thereby to the kiln chambers through the branches O' and casings $M^2$ in amounts which while relatively small are sufficient to keep the vulcanizing chamber full of carbon dioxide. Under this condition, carbon dioxide will continuously pass out thru the joints in its wall and at the entrance and exit ends of the latter or through separate exit ports, not shown, which may be provided for this purpose. The carbon dioxide thus continuously fed into the kiln will not only prevent the entrance of air which may sometimes be objectionable because of its oxidizing effect, but will sweep out of the chamber sulphur or other gases or fumes given off by the rubber. The valve $O^6$ is automatically opened as by means of a thermostat $A^{20}$ on a predetermined rise in temperature in the vulcanizing chamber to thereby permit large amounts of carbon dioxide to pass from the gas holder $O^4$ into the kiln chamber and thus form a positive means for lowering the temperature in the kiln. The thermostat $A^{20}$ may also well be employed as indicated to control a cut-off valve $A^{23}$ in the gas supply line $A^{25}$ so that when the valve $A^{21}$ is closed no gas can pass to the combustion chambers of the apparatus regardless of whether the various burner supply control valves $A^{22}$ are then open or have already been closed as they normally should be under such conditions by the corresponding thermostats $A^{21}$. In the contemplated mode of operation of the apparatus the valve $O^6$ will be open only during the periods in which the normal rate of car travel through the kiln is being substantially reduced or is interrupted by accident. In the former case the dampers $O^2$ which are normally wide open may be adjusted to regulate the distribution of the carbon dioxide cooling medium admitted at different points along the length of the zones A and C. It will be understood of course that instead of carbon dioxide any other suitable cooling gas or gaseous mixture as nitrogen or air may be used, a supply of which may be put into the gas holder $O^4$ through the valved inlet $O^8$.

In the further modification of the apparatus shown in Figs. 1 to 6 and in Figs. 16 and 17, which is illustrated in Figs. 18, 19 and 20, each of the combustion chambers A' shown in the first forms is replaced by a plurality of small combustion chambers which may be in the form of metal pipes 6" or so in diameter and each provided at its end adjacent the entrance end of the vulcanizing chamber with an individual gas burner. As shown, the combustion chamber pipes at each side of the pathway for the goods carrying cars are arranged in three groups, the pipes $A^{50}$ in one group extend to the entrance end of the kiln chamber; the combustion chambers $A^{60}$ forming another group start some distance away from the entrance end of the chamber, and the third group of combustion chambers $A^{70}$ start at a distance still greater from the entrance end of the vulcanizing chamber. All of the combustion chambers extend to the exit end of the zone. With the construction shown in Figs. 18, 19 and 20, the portions of the combustion chambers $A^{50}$ which overlap both the combustion chambers $A^{60}$ and $A^{70}$ heat the portions of the kiln chamber adjacent the entrance end of the zone A. An adjacent section of the kiln is heated by the portions of the combustion chambers $A^{50}$ and $A^{60}$ which overlap the combustion chambers $A^{70}$. Along the remainder of the zone A heat is supplied by all three sets of combustion chambers, $A^{50}$, $A^{60}$, and $A^{70}$.

As shown, the gas burner at the entrance end of each of the combustion chambers is in the form of a Bunsen burner comprising an air and gas mixing nozzle $A^{51}$ and an individual gas supply nozzle, the supply of gas through which is regulated by an individual valve $A^{52}$. As shown, the gas supply connections to the different burners are so arranged that the supply of gas to each group of combustion chambers $A^{50}$, $A^{60}$ and $A^{70}$ at each side of the apparatus may be separately controlled by a corresponding valve $A^{55}$, $A^{65}$ and $A^{75}$. It will be apparent that these valves may be controlled either manually or by thermostatic provisions as are the gas supply valves in the construction first disclosed. The combustion chambers for heating the zone C of the kiln may be arranged in groups similar to those for heating the zone A. As shown, in Fig. 18, there are two sets of combustion chambers for heating the zone C, the gas supply to each group being controlled by valves $A^{85}$ or $A^{95}$.

The special arrangement of the combustion chambers shown in Figs. 18, 19 and 20 permits of a very precise regulation of the heating of zones A and C and permits of a more gradual variation in the kiln atmosphere along the initial portions of the kiln zones and at the same time permits of a more rapid transfer of heat from the combustion chambers to the articles to be vulcanized than is possible with the combustion chamber arrangement shown in Figs. 1 to 6. The use of the circulation fans M is especially valuable with the relatively large heat radiating surfaces characteristic of the apparatus shown in Figs. 18, 19 and 20. I interpose between each group of combustion chambers $A^{50}$ and the pathway for the articles to be vulcanized, a barrier formed of a pair of vertical plates S' preferably of metal and separated from one another by spacing members $S^2$ to provide an air cooled passage between the plates. These spaced apart plates form an effective barrier against direct radiation of heat from the combustion chambers to the goods which is of relatively low heat storage capacity. These provisions make it possible to employ higher temperatures in the combustion chambers than would otherwise be safe. It will be understood of course, that the higher the temperature employed in the combustion chambers, the higher in general will be the thermal efficiency of the apparatus and the greater the capacity of the apparatus. There is a further indirect advantage of employing high temperatures in the combustion chambers in that it reduces the relative mass of and thereby heat storage capacity of the combustion chambers as compared with the mass of the rubber articles, their moulds and supporting cars, and thereby reduces the liability of overheating in case of interruption in normal operation.

In the apparatus shown in Figs. 18, 19 and 20, I have provided means for supplying water to the heating zones A and C to cool the latter in case of an undue rise in temperature therein. For this purpose, I provide a water supply pipe T' running alongside of the zone A with distributed lateral outlets T opening at the bottom of the zone A and I provide a similar pipe $T^2$ with outlets T for the zone C. The passage of the water to and through the outlets T is controlled by valves $T^{10}$ one for each of the pipes T' and $T^2$. When the valves $T^{10}$ are open and water is allowed to flow into the chambers A and C the temperature then prevailing in the zones will cause this water to be evaporated and the latent heat of the evaporation thus absorbed from the kiln rapidly lowers the temperature of the latter. It will be understood, of course, that suitable provisions should be made for permitting the discharge of the steam generated in the zones A and C under these conditions so as to avoid any appreciable rise in pressure therein. For this purpose, I have shown outlet passages $A^{40}$ at intervals along the roof of the kiln, each of the passages being normally closed by a cover $A^{41}$ forming in effect a simple safety valve set to open to permit the escape of steam on a very slight increase in the kiln pressure above that of the atmosphere. As shown the covers $A^{41}$ are formed with small constantly open leakage ports $A^{42}$ permitting the escape of $CO_2$ and vapors or fumes given off by the rubber. The water injection apparatus just disclosed may be used purely as an emergency device to supplement provisions such as those shown alike in Figs. 16 and 17 and 18 and 19 for cooling the vulcanizing chambers by flooding it with $CO_2$ or the like or may be used in lieu of the last mentioned provisions.

In the modified form of vulcanizing apparatus for moulded tires shown in Figs. 8 to 14 inclusive, the moulds are moved along a pathway comprising a preliminary heating section or zone AB, a transfer section BB, a combined secondary heating and curing zone or section CD, and a separate cooling zone EB. As shown, the preliminary heating zone AB is vertically disposed, the tire moulds XB with their tires being inserted one at a time at the upper end of the tower in which the zone AB is formed. The latter is always filled in normal operation by a stack of tire moulds XB, the moulds being withdrawn one at a time from the bottom of the zone AB by a transfer mechanism in the section BB of the apparatus. The moulds with their unvulcanized tire and core contents are fed into the zone AB, as shown, by a conveyor U.

In the downward movement of the tire moulds through the preliminary heating section AB they are progressively heated up partly by means of superheated steam injected by the pipe $A^{102}$ into the lower end of the section AB and flowing upward through the latter along the column of moulds, and partly by means of the steam heating coils $A^{101}$ arranged along the lower portion of the section AB. As shown, the steam pipes $A^{101}$ are three in number, each being bent into horizontal convolutions and curved to conform to the outline of the tire moulds XB. The lugs $X^2$ and $X^3$ of the latter project between the adjacent edges of the coiled pipes. The super-heated steam admitted to the lower end of the section AB and sweeping upward through the section serves as a transfer medium for transmitting heat from the pipes $A^{101}$ to the moulds and in practice the superheated steam need not lower appreciably in temperature in its passage through the lower portion of the section AB along the pipes $A^{101}$. As the steam passes to the portion of the section AB above the pipes $A^{101}$ it loses heat rapidly to the relatively cool tire moulds in this portion of the section AB and is wholly or largely condensed therein. To prevent the water of condensation from dripping down into, and being re-evaporated in the lower portion of section AB, I provide one or more water collecting troughs $A^{103}$ which surround and are open at their inner edge to the interior of the section AB, one of these being located at the lower end of the upper portion of the section. To divert the water of condensation forming on the moulds into the troughs $A^{103}$, I advantageously employ sheet metal baffles Y which are interposed between the adjacent tire moulds at intervals along the length of the column of moulds XB in the section AB. As shown, each of the baffles Y is formed of sheet metal, spun to provide a lip Y' which engages the inner surface of the mould XB on which the baffle is placed and thus center the baffle, which has its rim portion downwardly inclined and projecting into close proximity with the adjacent edge of the troughs $A^{103}$ as the baffle passes the latter in its downward movement through the section AB. The central portion of each baffle is advantageously domed so that water of condensation forming on it will flow readily to the rim of the baffle. To permit the free discharge of the water on the upper portion of each baffle, I advantageously form channels or grooves $X^{10}$ in the top and bottom edges of the moulds. Preferably, as shown, the upper as well as the lower portion of the tower forming the zone AB is shaped to fit closely about the column of tire moulds and the channels $X^{10}$ also permit of a circulation of steam into and out of the interior of the column of tire moulds which adds appreciably to the rapidity of heat transfer to the stack of tire moulds.

At the bottom of the section AB are located mould supports Z which are horizontally movable in guideways $Z^{10}$ and may be retracted to permit the column of tires to descend from the section AB to the section BB, or advanced to support the stack of tire moulds in the zone AB. The particular means shown for advancing and retracting the supports Z comprise toggle links $Z'$ and $Z^2$ connected to the piston rods $Z^3$ of double acting fluid pressure motors $Z^4$.

Within the transfer section BB is mounted a vertical cross head $B^{100}$ carried at the upper end of a piston rod $B^{101}$ connected to a piston working in the cylinder $W^2$ of a suitable fluid pressure motor.

In operation, the column of tire moulds in the zone AB is normally supported on the piston $B^{100}$ which is lowered a distance equal to the thickness of a tire mould each time a tire mould is fed into the top of the zone AB until the cross head $B^{100}$ moves from an initial position immediately below the stops Z, which are then in their retracted positions a distance corresponding to the height of the short columns or stacks of tire moulds moved through the zone CD as hereinafter described. As shown, each such stack comprises six moulds. The supports Z are next advanced to support the tire moulds above them. The cross head $B^{100}$ is then raised if necessary to compress and close the moulds between it and the supports Z. In practice, however, if the zone AB is high enough each mould as it passes out of the zone AB will be already closed by the weight of the column of moulds above it. Advantageously, one-half of each mould has links $X^{14}$ pivoted to its lugs $X^{12}$ which are adapted to be swung by their own weight along the curved edges of the lugs $X^{13}$ on the other half of the mould and thus lock the two halves of the mould together when the latter is closed.

With the moulds closed the cross head $B^{100}$ is adjusted to bring its upper surface flush with the top of the rails GA in the zone CD and the mould pusher JA is then actuated to force the moulds off the cross head $B^{100}$ and into the zone CD. The pusher JA is then retracted and the cross head $B^{100}$ is moved upward into its initial position in which it engages the lower end of the column of tire moulds in the zone AB, after which the stops Z are retracted and the cross head $B^{100}$ again lowered as moulds are fed into the upper end of the zone AB.

The section CD is heated to raise the temperature of the moulds and tires to the final vulcanization temperature by means of steam pipes $CD^{10}$ at the sides of the pathway for the tire moulds. The train or row of short stacks of moulds normally filling the zone CD is advanced a distance equal to the external diameter of a mould by the pusher JA each time the latter is operated. Advantageously, the section CD may be inclined to facilitate the operation of pushing the moulds thru it. The track rails GA on which the moulds slide are shown as mounted on posts $G^{10}$ to permit a circulation of the kiln atmosphere under the rails. Circulating fans M are mounted in the roof of the heating up portion of the zone CD.

The cooling zone EB may be constructed like the cooling zone E first described but as shown is provided with a belt conveyor $E^{10}$ for transporting the short stacks of tire moulds pushed into the zone EB from the zone CD. As shown, the steam pipes $A^{101}$ and $A^{102}$ in the zone AB and the pipes $CD^{10}$ which heat the zone CD are supplied by pipes $N^2$ and $N^3$ and $N^4$ respectively, with superheated steam from the superheating coil $N'$ of a boiler N. To enable the temperatures along the length of the zone CD to be graduated as desired the pipes $CD^{10}$ are arranged in sections each having its individual valve regulated connection to the supply pipe $N^4$. The water of condensation formed in the apparatus is passed to a receiver $N^{10}$ thru corresponding steam traps $N^{11}$ and return pipes $N^{12}$. The receiver $N^{10}$ may be arranged to serve as a condenser for vapors entering it with the water of condensation. A boiler feed pump $N^{13}$ feeds the water from the receiver $N^{10}$ back to the boiler N. Steam passing through the zone AB without being condensed therein may be discharged into the atmosphere through the stack $A^{150}$.

In the modification illustrated in Fig. 15, the vulcanizing apparatus comprising a preliminary heating zone AC, a mould compressing zone B, a secondary heating and soaking zone CC, a curing or soaking zone DC and a cooling zone EC, and through which the tires and moulds or other articles may be moved on cars as in the apparatus shown in Figs. 1 to 6. The apparatus shown in Fig. 15, however, is arranged to be heated entirely by the use of steam. In the apparatus shown in Fig. 15 an initial portion of the preliminary heating zone AC is heated by injecting steam which need not be superheated directly into the zone at atmospheric pressure. For this purpose I provide a steam supply pipe $A^{200}$ having outlets at intervals along the initial portion of the zone AC. $A^{201}$ represents the outlet formed in the bottom wall of this portion of the zone for the escape of water of condensation. By injecting steam directly into the initial portion of the zone AC, I am enabled to heat the moulds and tires up to 212° F. with great rapidity and in consequence can make the length of the preliminary heating zone shorter than is required with other embodiments of my invention. It will be understood of course, that ordinarily steam should be injected into the initial portion of the zone AC only as rapidly as it is condensed therein so that there will be no appreciable flow of steam out of the ends of the portion of the zone into which the steam is directly injected. The final portion of the zone AC and the combined secondary heating and soaking zone CC are heated by steam pipes $A^{202}$ having distributed and suitably controlled steam inlets $A^{203}$ and outlets $A^{204}$. The pipes $A^{202}$ are located at the sides of the pathway for the mould carrying cars. The mould compressing zone B and cooling zone EC may be equipped as are the zones B and E respectively of Figs. 1 to 6.

While the various forms of apparatus illustrated in the drawings are all especially devised and adapted for use in vulcanizing tires in metallic moulds, they can all be used without other than obvious changes in proportions and the character of the goods carrying means to vulcanize other rubber articles whether vulcanized in moulds or not. In vulcanizing articles not enclosed and protected by moulds, it is necessary, of course, to maintain lower maximum temperatures in the heating up zones than can be advantageously employed in vulcanizing articles protected by heavy metallic moulds with such apparatus as shown in Figs. 1 to 6 and Figs. 8 to 14 and 16 to 20.

In general, moreover, the apparatus disclosed herein may be used for other purposes than vulcanization such as in lacquering and enamelling which require articles to be subjected to temperatures analagous to the relatively low temperatures employed for vulcanization and certain novel features of the apparatus disclosed are useful where substantially higher temperatures are required.

While in accordance with the provisions of the statutes I have illustrated and described the best forms of my invention now known to me, it will be apparent to those skilled in the art that changes may be made in the form of apparatus disclosed and in the descriptive methods of using the same without departing from the spirit of my invention and that certain features of my invention may sometimes be used to advantage without a corresponding use of other features.

Having now described my invention, what I claim as new, and desire to secure by Letters Patent, is:

1. The method of vulcanizing rubber articles which consists in moving the articles through a chamber, supplying heat to the chamber as required to vulcanize the articles during their passage through said chamber, and injecting a cooling medium into the chamber when necessary to protect the articles against overheating.

2. The method of vulcanizing rubber articles which consists in moving the articles through a chamber, supplying heat to the chamber as required to vulcanize the articles during their passage through said chamber, and cooling the chamber when necessary to avoid overheating by evaporating water in the chamber.

3. The method of vulcanizing rubber articles which consists in moving them through a chamber, heating a body or bodies having surfaces exposed in and disposed longitudinally of the chamber and maintaining a forced circulation of the kiln atmosphere over said surfaces and the articles.

4. A method of vulcanizing rubber articles which consists in moving articles through a chamber, supplying heat to the chamber at distributed points along the length of the latter as required to vulcanize the articles during their passage through said chamber, and supplying a suitable gaseous medium to said chamber as required to maintain an atmosphere of such medium in the chamber.

5. The step in the method of vulcanizing rubber articles by passing them through a chamber so heated that the articles will be vulcanized in their passage which consists in heating an initial portion of the chamber to a temperature approximating 212° F. by injecting steam at atmospheric pressure into the same.

6. The method of vulcanizing rubber articles in moulds closed after a preliminary heating of the articles which consists in passing the articles and their containing moulds through a chamber, heating the chamber as required to gradually raise the temperature of the articles to a desired final vulcanization temperature and to complete their vulcanization during their passage through said chamber, and closing each mould after the mould has completed a portion of its movement through said chamber.

7. The method of vulcanizing rubber articles in moulds which are closed after a preliminary heating of the articles which consists in advancing the articles and their containing moulds step by step through a heated chamber and closing each mould at an intermediate point in said chamber during an interval between successive stops in its step by step movement thru said chamber.

8. The method of vulcanizing rubber articles in moulds which are closed after a preliminary heating of the articles which consists in passing the moulds through a heated chamber, compressing each mould to close it at an intermediate point in said chamber and locking the mould to maintain it in its closed condition during its travel through the subsequent portion of the chamber.

9. The method of vulcanizing rubber articles which consists in passing them through a chamber and mechanically circulating the chamber atmophere transverse to the length of said chamber to transfer heat to the articles from hot bodies disposed along the length of the chamber while shielding the articles against heat radiation from said bodies.

10. A continuous vulcanizing apparatus comprising in combination a chamber, means for continuously moving the articles to be vulcanized through said chamber, means for heating said chamber and means for injecting a fluid cooling agent into said chamber when necessary to prevent overheating of the articles.

11. A continuous vulcanizing apparatus comprising in combination an elongated vulcanization chamber, means for progressively moving the articles to be vulcanized through said chamber, a hot body extending along said chamber, and fans for creating a circulation of the kiln atmosphere transverse to the length of said chamber whereby the latter is heated by said body and heats said articles.

12. In vulcanizing apparatus, the combination of an elongated vulcanization chamber, means for moving the articles to be vulcanized through said combustion chambers, means for heating an initial portion of the chamber to raise the temperature of the articles up to the vulcanization temperature during their passage through said portion of the chamber, and separate steam pipe means for heating a subsequent portion of the chamber to maintain the articles at the vulcanization temperature during their passage therethrough.

13. A continuous vulcanizing apparatus comprising in combination an elongated vulcanization chamber, means for progressively moving the articles to be vulcanized through said chamber, means for heating said chamber, and means for injecting a fluid cooling medium into the chamber when necessary to prevent overheating of the articles.

14. A continuous vulcanization apparatus comprising in combination an elongated chamber means for progressively moving articles to be vulcanized through said chamber, means for heating said chamber, and means for injecting a non-oxidizing gas into said chamber in small amounts to prevent the influx of air and to maintain in the chamber an atmosphere of said gas.

15. A continuous vulcanizing apparatus comprising in combination an elongated chamber, means for passing the articles to be vulcanized progressively through said chamber, means for injecting steam into an initial portion of the chamber to maintain a temperature therein approximating 212° F., and other means for heating a subsequent portion of said chamber to a vulcanization temperature substantially higher than 212° F.

16. A continuous vulcanization apparatus comprising an elongated chamber, means for moving the articles to be vulcanized progressively through said chamber, a heating body extending longitudinally of each chamber and normally maintained at a temperature substantially above the desired vulcanization temperature for the articles, thermostatic means responsive to the temperature in said chamber for controlling the heating of said heating body, and means for injecting a fluid cooling medium into said chamber when necessary to prevent overheating of the articles.

17. In vulcanization apparatus, the combination of an elongated vulcanizing chamber comprising a preliminary heating zone, a mould compressing zone and a secondary heating zone, means for passing articles to be vulcanized successively through said zones, means for heating said two heating zones and mould compressing apparatus located in said mould compressing zone.

18. In vulcanization apparatus, the combination of an elongated vulcanizing chamber comprising a preliminary heating zone, a mould compressing zone and a secondary heating zone, means for passing articles to be vulcanized successively through said zones, means for heating said two heating zones and mould compressing apparatus located in said mould compressing zone, and means for locking the moulds in their compressed condition.

19. Apparatus of the character specified comprising in combination an elongated chamber closed against any substantial influx of air, means for progressively moving articles to be heated through said chamber, a heated body extending longitudinally of the chamber and fans for setting up a vigorous circulation of the chamber atmosphere past said bodies and from them to the goods and past the goods and from them back to said bodies.

20. Apparatus of the character specified comprising in combination an elongated chamber, means for passing articles to be heated through said chamber, heated bodies extending longitudinally of the chamber in heat transmitting relation to the articles passing through the chamber, and means for injecting carbon dioxide into said chamber in small amounts to normally maintain a carbon dioxide atmosphere in the chamber, and in larger amounts to cool the chamber when cooling becomes desirable.

21. Apparatus of the character specified comprising in combination an elongated chamber, means for passing articles to be heated through said chamber, heated bodies extending longitudinally of the chamber in heat transmitting relation to the articles passing through the chamber, and means for injecting a gaseous medium into said chamber in small amounts to normally maintain an atmosphere in the chamber of said medium, and in larger amounts to cool the chamber when cooling becomes desirable.

22. Apparatus of the character specified comprising in combination an elongated heating chamber, means for progressively moving the articles to be heated through said chamber, means for heating said chamber comprising a heated body extending along the chamber, means cooperating therewith to maintain a directed circulation of the kiln atmosphere whereby the kiln atmosphere transmits heat from the body to the articles, and means for injecting a fluid cooling medium into the chamber when necessary to prevent overheating of the articles.

23. In a tunnel kiln, the combination with the kiln chamber and the means for moving articles to be heated through the kiln, of the kiln heating means comprising provisions for injecting steam into one portion of the kiln chamber at atmospheric pressure, and separate means for heating another portion of the kiln chamber.

24. In a tunnel kiln, the combination with the kiln chamber and the means for moving articles to be heated through the kiln, of the kiln heating means comprising provisions for injecting steam into one portion of the kiln chamber at atmospheric pressure, provisions for collecting and withdrawing the resultant water of condensation, and separate means for heating another portion of the kiln chamber.

25. In a tunnel kiln comprising an elongated heating chamber, means for progressively moving articles to be heated through said chamber, and muffle heating means for said chamber, the improvement which consists in means for injecting a fluid cooling medium into the chamber when necessary to prevent overheating of the articles.

26. Apparatus of the character specified comprises in combination an elongated kiln chamber, means for progressively moving articles to be heated through said chamber, and combustion chambers located in the chamber and comprising a plurality of groups of combustion chambers arranged side by side for a portion of their length but with the chambers of one group extending past the chambers of another group toward one end of the kiln chamber and separate fuel burners for the different combustion chambers at their ends adjacent the last mentioned end of the kiln chamber.

27. In a tunnel kiln comprising an elongated chamber, means for moving the articles to be heated progressively through said chamber, a heated body extending along said chamber and normally maintained at a temperature substantially above the desired temperature for articles adjacent them, and thermostatic means responsive to the temperature in said chamber for controlling the heating of said body, the improvement which consists in means for injecting a fluid cooling medium into said chamber when necessary to prevent overheating of the articles.

28. In a tunnel kiln comprising a kiln chamber and means for moving articles to be heated through said chamber, the improvement which consists in improved kiln heating means comprising a plurality of internally heated conduits extending longitudinally of the chamber and arranged so that some overlap others.

29. In a tunnel kiln comprising a kiln chamber and means for moving articles to be heated through said chamber, a combustion chamber longitudinally disposed in said chamber, and air and fuel supply and waste gas outlet connections thereto so disposed that the products of combustion and articles travel through the kiln in the same direction, and thermostatic provisions regulating combustion in said combustion chamber.

30. In a tunnel kiln comprising a horizontally elongated kiln chamber, means for moving articles to be heated longitudinally through said kiln, a heating body or bodies at the side of the pathway for the articles, the improvement which consists in a baffle interposed between said body or bodies and said pathway and spaced away from the top and bottom wall of said chamber and formed of metal plates spaced apart to form a ventilating channel between the plates open at top and bottom of the kiln.

31. In a tunnel kiln, the combination with the kiln chamber and means for moving articles to be heated through said chamber, of heating means for the chamber comprising combustion chambers for heating a heating-up zone and steam pipes for heating a soaking zone of the kiln chamber.

32. In a tunnel kiln, the combination with the kiln chamber, means for moving articles to be heated through said chamber and means for heating chamber to a normal temperature exceeding 212° F of means for injecting water into said chamber when necessary to prevent overheating of the articles and provisions for the escape of the resultant steam.

33. Apparatus of the character specified comprising in combination a heating chamber, combustion chambers for heating said combustion chambers, a gas holder, means for passing into said gas holder products of combustion passing out of said combustion chambers and means for passing a regulated amount of products of combustion from said gas holder into said heating chamber.

34. In a tunnel kiln the combination with an elongated kiln chamber comprising a preliminary heating zone and a secondary heating zone and means for moving articles to be heated first through the said preliminary heating zone of said chamber and then through said secondary heating zone and means for heating said preliminary heating zone comprising combustion chambers extending longitudinally thereof, and means for causing heating gases to flow through said chambers longitudinally of the kiln chamber in the same direction as the articles to be heated pass through the kiln chamber.

Signed at New York, in the county of New York and State of New York this twenty-second day of November, A. D. 1919.

CONRAD DRESSLER.